Figure 1:
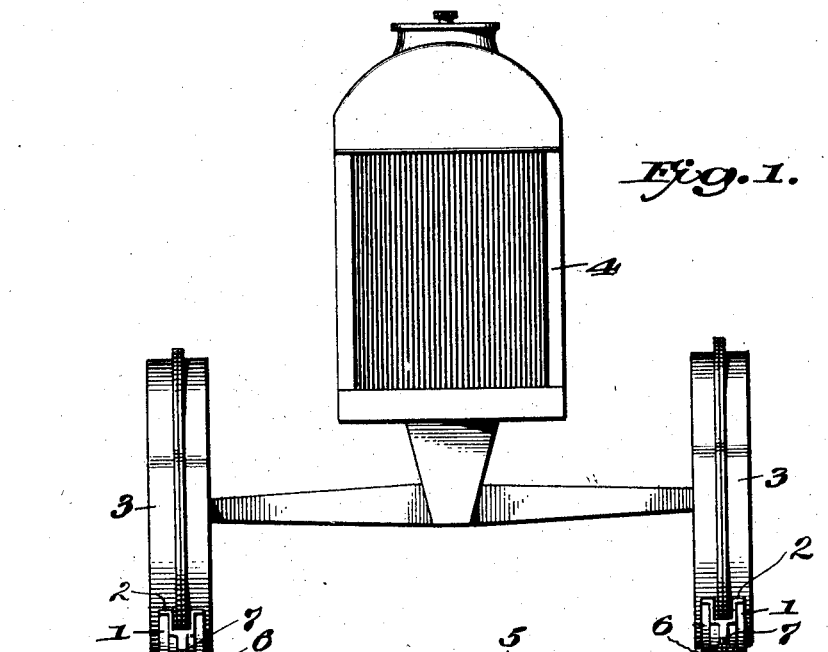

E. L. VAN DOLSEN.
POWER UNIT LOCATING MEANS.
APPLICATION FILED JUNE 16, 1919.

1,350,347.

Patented Aug. 24, 1920.

INVENTOR
Emmet K. Van Dolsen

BY
Clement R. Stickney
ATTORNEY

UNITED STATES PATENT OFFICE.

EMMET L. VAN DOLSEN, OF SHELBYVILLE, INDIANA.

POWER-UNIT-LOCATING MEANS.

1,350,347.  Specification of Letters Patent.  Patented Aug. 24, 1920.

Application filed June 16, 1919. Serial No. 304,503.

*To all whom it may concern:*

Be it known that I, EMMET L. VAN DOLSEN, citizen of the United States, residing at Shelbyville, in the county of Shelby and State of Indiana, have invented certain new and useful Improvements in Power-Unit-Locating Means, of which the following is a specification.

In the use of tractors or automobiles for driving machines, such as corn shellers, electric light plants, feed grinders, portable saw mills and the like, it is desirable to have some means whereby such plants may be readily connected and held in operative relation to the power shaft of the tractor or automobile at any place where it is desirable to use the plant without the necessity of fixed counter-shafts or the like.

This invention relates to a power block or frame which holds a portable power unit or piece of mechanism and a tractor or automobile in fixed relation so that a belt or like driving connection may be readily applied to the power member of the tractor and the power driving member of the unit without any particular trouble or any adjustment of the belt or other driving connection.

The invention consists in the matters hereinafter set forth, and more particularly pointed out in the appended claims.

Figure 2:
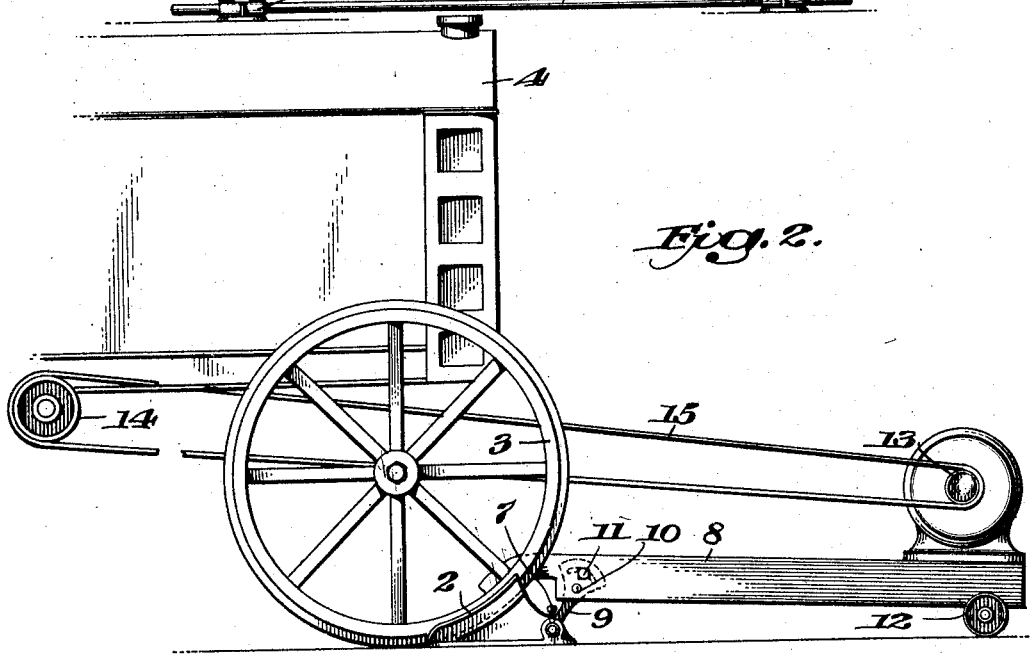

In the drawings:

Figure 1 is a view in front elevation of a portion of a tractor provided with a power block that embodies features of the invention; and Fig. 2 is a view in side elevation of the tractor and power block with power unit, here shown as an electric generator, coupled thereto.

As herein illustrated in preferred form, a pair of shoes 1, each having a curved face 2 that conforms to the tread of the bearing wheel 3 of a tractor 4, are arranged to rest on the ground against the bearing wheels 3 and are held in spaced relation by a cross member 5 which passes through lugs 6 of the shoes. Cap screws 7 or the like secure the shoes in adjusted position on the member 5.

The latter acts as a locating member whereby the frame 8 of a portable power unit may be quickly placed in operative relation to the tractor. As herein indicated, adjustable brackets 9 on the frame 8 have forked ends adapted to embrace the member 5 and are shiftable on pivots 10. Bolts 11 passing through the frame and engaging segmental slots in the brackets 9 afford means for angular adjustment of the latter for alinement and belt adjustment. The frame 8 which is preferably proportioned and designed like a hand truck rests at the end remote from the brackets 9 on bearing wheels 12 so that it is readily trundled into such position as to bring a driving pulley 13 into alined and spaced relation with the power pulley 14 of the tractor 4. A belt 15 or like suitable connection may then be used as a power transmitting member.

As a result of this construction, any tractor or automobile having a power driving member, may be readily placed at any spot where it is convenient and a power unit or plant quickly coupled thereto by use of the power block which not only holds the parts in spaced relation but also prevents any movement of the tractor or automobile toward the power plant. Thus the tractor and power unit are available for use at any place in the field or building, to which they can at once be taken and the necessity of a fixed or permanently located counter-shaft or like intermediate transmission mechanism is avoided together with the loss of power and of mobility.

Obviously, changes in the details of construction may be had without departing from the spirit of my invention and I do not care to limit myself to any particular form or arrangement of parts.

What I claim is:

1. A power block for use with tractors comprising a spacing member, a pair of shoes adjustably mounted on the spacing member and provided with faces conforming to the treads of the wheels of the tractor and means adjustably securing the shoes on the spacing member.

2. The combination of a tractor, a pair of wheels thereof and a power driving member with a power unit, adjusting brackets on the unit, and a power block consisting of shoes adapted to rest on the ground in contact with the bearing wheels of the tractor and a spacing member connecting the shoes adapted to interlock detachably with the adjusting brackets of the power unit.

3. The combination of a tractor having a pair of wheels and a power driving member with a power block adapted to rest on the ground in contact with bearing wheels of the tractor, a portable power unit and adjusting brackets on the power unit adapted to interlock detachably with the power block.

4. The combination of a tractor with a power block adapted to rest on the ground in contact with wheels of the tractor and a power unit truck frame provided near one end with trundling wheels and near the other end with adjustable means for detachably interlocking with the power block.

In testimony whereof I affix my signature.

EMMET L. VAN DOLSEN.